(12) United States Patent  
Vantalon et al.

(10) Patent No.: US 7,091,904 B2  
(45) Date of Patent: Aug. 15, 2006

(54) TRACKER ARCHITECTURE FOR GPS SYSTEMS

(75) Inventors: Nicolas Vantalon, Sunnyvale, CA (US); Leon Kuo-Liang Peng, Mountain View, CA (US); Gregory Turetzky, San Jose, CA (US)

(73) Assignee: SiRF Technology, Inc., San Jose, CA (US)

( * ) Notice: Subject to any disclaimer, the term of this patent is extended or adjusted under 35 U.S.C. 154(b) by 221 days.

(21) Appl. No.: 10/199,253

(22) Filed: Jul. 18, 2002

(65) Prior Publication Data

US 2004/0252049 A1    Dec. 16, 2004

Related U.S. Application Data

(60) Provisional application No. 60/306,620, filed on Jul. 18, 2001.

(51) Int. Cl.
*G01S 5/14* (2006.01)
*G06F 15/163* (2006.01)

(52) U.S. Cl. .................. 342/357.03; 701/213
(58) Field of Classification Search .......... 342/357.02, 342/357.03; 701/213
See application file for complete search history.

(56) References Cited

U.S. PATENT DOCUMENTS 5,504,684 A * 4/1996 Lau et al. ................. 455/3.02

| | | | |
|---|---|---|---|
| 5,519,403 A * | 5/1996 | Bickley et al. | 342/352 |
| 5,761,456 A * | 6/1998 | Titus et al. | 710/305 |
| 5,877,725 A * | 3/1999 | Kalafus | 342/357.12 |
| 5,920,283 A * | 7/1999 | Shaheen et al. | 342/357.12 |
| 6,593,878 B1 * | 7/2003 | Fall | 342/357.1 |

OTHER PUBLICATIONS

Zarlink Semiconductor, "GP2021 GPS 12 Channel Correlator," Apr. 2001, pp. 1-63.*

Mattos, P.G., "WAAS/EGNOS-Ready 2-Chip GPS Chipset," 5th Int Conf on Satellite Systems for Mobile Communications and Navigation, May 1996, pp. 24-27.*

Kibe, Dr. S. V. et al, "Software-based GIC/GNSS Compatible GPS receiver Architecture Using TMS320C30 DSP Processor" IEE Satellite Systems for Mobile Comm and Navigation, May 1996.*

* cited by examiner

*Primary Examiner*—Gregory C. Issing

(57) ABSTRACT

A tracker architecture for Global Positioning System (GPS) receivers is disclosed. A typical tracker comprises an RF front end and GPS architecture. The architecture comprises a bus structure, a Central Processing Unit (CPU) core, cache, RAM, and ROM memories, and a GPS engine that comprises a receiving, tracking, and demodulating engine for GPS and Wide Area Augmentation Service (WAAS) signals. The GPS architecture can couple to at least two different protocol interfaces via the bus structure, where the protocol interfaces are commonly used in different applications.

21 Claims, 1 Drawing Sheet

TRACKER ARCHITECTURE FOR GPS SYSTEMS

CROSS REFERENCE TO RELATED APPLICATIONS

This application claims priority under 35 U.S.C. §119(e) of U.S. Provisional Patent Application No. 60/306,620, filed Jul. 18, 2001, entitled "TRACKER ARCHITECTURE FOR GPS SYSTEMS," by Nicolas Vantalon et al., which application is incorporated by reference herein.

This application is also related to U.S. Pat. No. 5,901,171, by Sanjai Kohli et al., entitled "TRIPLE MULTIPLEXING SPREAD SPECTRUM RECEIVER," and related to U.S. Pat. No. 6,278,403, by Leon Kuo-Liang Peng et al, entitled "AUTONOMOUS HARDWIRED TRACKING LOOP COPROCESSOR FOR GPS AND WAAS RECEIVER," both of which applications are hereby incorporated by reference herein.

BACKGROUND OF THE INVENTION

1. Field of the Invention

The present invention relates in general to Global Satellite System (GSS) receivers, and in particular to a tracker architecture for Global Positioning System (GPS) systems.

2. Description of the Related Art

Currently, there are many GPS systems available that can acquire, track, and navigate using GPS signals. However, the navigation and tracking architectures for these systems vary widely. Many of these systems are not optimized for tracking or navigation, and are designed to work with only one type of GPS system.

SUMMARY OF THE PRESENT INVENTION

To minimize the limitations in the prior art described above, and to minimize other limitations that will become apparent upon reading and understanding the present specification, the present invention discloses, a tracker architecture for Global Positioning System (GPS) receivers. An architecture in accordance with the present invention comprises a bus structure, a Central Processing Unit (CPU) core, cache, RAM, and ROM memories, and a GPS engine that comprises a receiving, tracking, and demodulating engine for GPS and Wide Area Augmentation Service (WAAS) signals. The GPS architecture can couple to at least two different protocol interfaces via the bus structure, where the protocol interfaces are commonly used in different applications.

The present invention is a member of digital signal processors used for a GPS navigation architecture. The present invention is built on a state-of-the-art, low power, 0.18 micron CMOS process. This highly integrated design includes a compatible GPS/WAAS (wide area augmentation signal) Digital Signal Processor (DSP) engine, Satellite Signal Tracking Engine (SSTE), BEACON DSP, ARM microprocessor, real time counter (RTC), dual UART, interrupt controller, ROM, SRAM, on-chip ADC, Multiple serial interfaces (including I2C, USB, CAN, J1850 and SPI), two-way associate cache, and bus interface unit (BIU).

The present invention provides the architecture flexibility to support all GPS market segments: Cellular Phone, Car Navigation, GPS Hand-helds, Consumer Electronics, PC accessory and others, because the present invention integrates the CPU core, memory, GPS engine and other system peripherals. As a minimum system configuration, a receiver can comprise an RF front-end, and the present invention, which is used as a backend digital component. The present invention also has extra computing power to run applications other than GPS tracking and navigation. The present invention is fully compatible with many types of tracking and navigation software.

BRIEF DESCRIPTION OF THE DRAWINGS

Referring now to the drawings in which like reference numbers represent corresponding parts throughout.

DETAILED DESCRIPTION OF THE DRAWINGS

Figure 1:
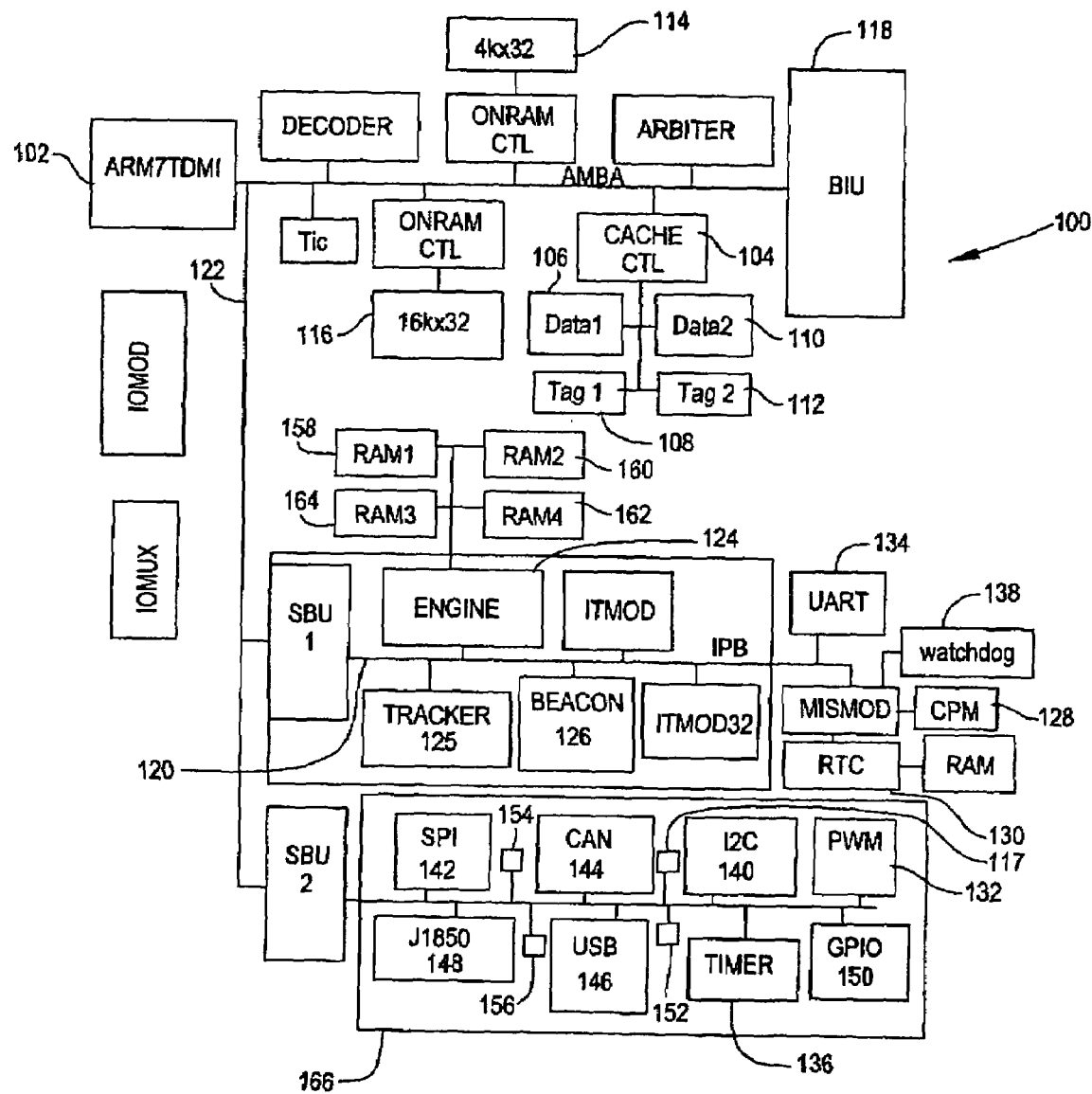
FIG. 1 illustrates an architecture in accordance with the present invention.

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Overview

When integrating GPS components and receivers with other electronics, e.g., cellular telephones, automotive systems, etc., the GPS components must be readily compatible with such systems and still retain the ability to acquire and track the GPS satellites under the conditions presented by each of the environments that the GPS components will be introduced into. The present invention combines the systems typically present in a GPS baseband tracker architecture, and provides a single, multi-function interface that is compatible with several different protocols, such that a baseband processor made using the tracker architecture of the present invention can be used in several different applications.

A baseband processor used in the tracker architecture of the present invention typically is manufactured using a 0.18 micron low power CMOS process. This allows for smaller die sizes, as well as low power consumption.

The present invention allows for different operating voltages, typically 3.3 volts, 2.5 volts, or 1.8 volts dc. These voltages are used not only for the baseband processor, but also for the Real Time Clock (RTC) and for the I/O drivers used with the architecture of the present invention. To conserve power, the internal core typically operates at 1.8 volts, so that the processor and other integrated portions of the present invention use as little power as possible. Further, the present invention operates over a wide range of temperatures, typically −40 to +85 degrees Centigrade, and also meets the QS9000 standard for semiconductor circuit manufacture.

Block Diagram

FIG. 1 illustrates a block diagram of the present invention. Appendix A illustrates some sample terms used throughout this disclosure and in FIG. 1. Appendix B illustrates the input/output description of the present invention.

Architecture 100 of the present invention is shown with several components, described below.

ARM7TDMI

The ARM7TDMI 102 is a member of the Advanced RISC Machines (ARM) family of general purpose 32-bit microprocessors, which offer high performance for very low power consumption. Although described herein as an ARM7 or an ARM7TDMI 102, it can be appreciated by one knowledgeable in the art that other microprocessors can be used in lieu of or in conjunction with the ARM7TDMI 102 without departing from the scope of the present invention. The ARM7TDMI 102 is intended to run at the maximum speed of 50 MHz to deliver an approximate maximum 40 Million Instructions per second (Mips).

Cache

A 9K byte RAM cache 104 is typically used for the cache module. It can function as a local RAM for timing critical code loops, or as a cache memory. When the cache is disabled, the 9k byte of memory can be used as an on chip memory if desired. In cache mode, a total of 8 K bytes are used as code/data cache 106 and 1 K byte is used as tag memory 108. A two-way set associated cache can be activated, as shown with data cache 110 and tag cache 112. The Cache 104 can be used for both instruction code and data. A LRU and write through logic can also be activated if desired.

Processor Memory

The architecture 100 also incorporates an on-chip low power 4K×32 SRAM 114 for data and 16K×32 Boot ROM 116 for code. The ROM 116 is typically programmed in the prototype stages for supporting the tracker only code and the other program code is typically contained in external memory (not shown). The ROM 116 code can have several versions, and may be changed depending on which version of the architecture or which revision of the chip is used. The BIU 118 can access the external memory as needed, and supports byte, Hword, and word accesses to the external memories. The architecture 100 is able to boot from internal or external memory regarding a power up configuration.

Internal ROM

The architecture 100 of the present invention includes internal ROM 116 code that provides at least two primary functions and one or more secondary functions. The primary functions include a boot loader program to load user code into the internal memory 114 and/or cache 104 of the architecture 100 and a receiver interface program to control the SSTE and WAAS channel demodulator. This receiver interface program will report data and provide control to the user via one of the built in serial interfaces. The receiver interface program also optionally includes an autonomous mode, which enables the architecture 100, along with autonomous code stored in the ROM 116, when coupled to a RF front end, to acquire, and track the GPS signal without any external intervention by the user. The user can selectively choose the use of the autonomous mode, and the autonomous code stored in the ROM 116, either automatically or manually. The secondary functions include built-in-test functions, and functions to allow insertion of new code into the internal RAM 114 and/or cache 104. The inserted code can incorporate itself into and expand the functions of the receiver interface function. Additional optional secondary functions include a program to perform automatic detection of externally interfaced memory chips to allow expansion or replacement of the computer instructions resident in the ROM 116.

ADC

The Analog-to-Digital Converter (ADC) module 117 is typically a 14 bit module that comprises a sinc3 filter and the filter's interface to the CPU 102. The Sinc3 filter processes the single bit over-sampled output from the sigma-delta modulator, and outputs the 16-bit wide data, at a 50 Hz sample rate, to four separate registers corresponding to the input channels.

Peripheral Bridge

An internal peripheral bridge 120 is used as the bridge between the ARM7TDMI 102, CPU bus 122, and the IP bus (Also called the SiRF IP Bus, or SIPB). The SIPB provides an adaptive connection to various types of peripherals for ease of future system expansion. The SIPB protocol is synchronous to the CPU clock. The fundamentals of the protocol take a minimum of three clock cycles to access all the peripherals. The bridge 120 also adds the wait state insertion capability for the DSP engine and other peripherals, which may take more clock cycles to access. Two bridges 120 are designed into the present invention, and both bridges can be either 32-bit or 16-bit. One bridge 120 is AMBA1D compatible and the other is AMBA1E compatible.

GPS/WAAS Engine

The present invention incorporates a GPS/WAAS engine 124 that tracks, receives, and demodulates both GPS and WAAS satellite signals. To accelerate the initial acquisition, the engine 124 uses a multiple frequency bin correlator, which performs a correlation on the 4 coherently integrated samples for each of 240 taps, and generates 8 frequency bins as an output. Multiple frequency bin correlator outputs are non-coherently integrated and the final result will be peak detected to locate the two largest values. The coherent and non-coherent integration counters are independently programmable in the resolution of segment. The coherent integration and non-coherent integration start point can be set at a user time ms boundary and at a half ms boundary for WASS data. The multi-path mitigation and early-late hardware runs in parallel with the tracking channels. When using the multi-path mitigation and early-late modes, the tape of the multi-path correlator provides an improved restoring force for the code tracking. To support the WAAS channel demodulation, the convolution decoder is added for WAAS channel demodulated data. All the satellite channels are configurable for either CPU or SSTE. The shared memory micro-architecture also provides a low power solution, as well as providing a low gate count.

SSTE

In initial acquisition mode, the tracker (also called the SSTE) 125 autonomously steps through the code, frequency search windows, and histogram to perform strong side lobe rejection and sync verification.

In track mode, the SSTE 125 executes pull-in, narrow track, and bit sync, data demodulation. Functional blocks include code/Costas lock detect, Costas/AFC loop filter, code loop filter, bit sync histogram, sample normalization, SNR measurement, bit demodulation. When code lock is lost, reacquisition executes resume, normal, stay modes, 10 Hz track status and demodulated data output to software include code, carrier, bitsync status, demodulated data bits, accumulated |I|, |Q|, code, carrier phase. The SSTE 125 handles all mode transitions autonomously with software override capability.

Beacon Processor

The beacon processor 126 uses the frequency discriminator approach chosen over coherent QPSK demodulation or FSK non-coherent demodulation as the best trade off between performance and implementation complexity. The signal interface is via a 10 bit external A/D on the synchronous serial interface. The hardware performs downconversion, decimation, filtering, discriminator calculation, bit sync, and data demodulation. The software programs the data rate and downconversion frequency. The hardware outputs the data at a HW/SW interface at 50 Hz rate. The ADC peak clipping scheme is used to combat strong pulse jamming. A 3-pole cascaded Butterworth low pass filter is used before the frequency discriminator.

Power Management

The power management block 128 provides the controlling software, and optimizes the power for all the major blocks in the design of the present invention. The wake-up interrupt logic in the interrupt controller facilitates the wake-up on any interrupt as selected by the controlling software. The minimum power configuration of the chip is used to apply the power to the RTC module 130, and battery back-up RAM is typically then active. The rest of circuit is in a power down mode. The target power consumption of the power down is around 5 uA. During the standby, the chip typically uses less than 100 uA.

RF Interface

As part of the standard interface for the architecture 100, connections to the RF portion of the GPS receiver are required. Signal wires of PWM 132 AGC protocol are implemented for a 1 kHz automatic gain control (AGC) interface. A single ended PECL physical interface is used for two GPS clock lines and two GPS/WAAS data lines.

UART

Both the transmit and receive sides of each UART port 134 contain a 16-byte deep FIFO with a selectable bit rate from 1200 to 115.2 Kbps. The parity, data bits and stop bits are also configurable. Each receive resister also provides error signals for frame error, parity error, overrun error, and break interrupt.

Timer

The present invention incorporates a timer function 136 whereby a free-running counter may be used to raise interrupts when the count value reaches programmable thresholds. The clock for this timer function 136 block may be sourced from either the 49.107 MHz clock, the 38.192 MHz clock, an external user-defined clock as shown in FIG. 1, or from the 32 KHz input (default), with the source selection programmable by software. Furthermore, 1, 8, 32, 128 or 2048 may divide the selected source clock for this block.

Watch-dog

The present invention provides a watchdog function 138 whereby a free-running counter requires a regular service by the controlling software; otherwise a watchdog reset is issued which in turn causes a full system reset to the device excluding the RTC 130.

RTC

The RTC 130 is used to maintain seconds, minutes, hours and days for the architecture 100 while requiring extremely low power. It has a separated power input so that the rest of core logic can be shut down but time maintained at the RTC 130 for the next power on. This RTC 130 enables a low power state, and other power management features, to significantly reduce power consumption during normal operation. The RTC 130 of the present invention contains a 1024×16 memory backup RAM for the critical information. The RTC 130 of the present invention is typically clocked by a 32.784 KHz signal with an on-chip oscillator.

Interrupt Controller

The interrupt controller manages all possible sources of interrupts from within the Peripheral Bus. These include the GPS/WAAS engine, SSTE, Beacon, DSP, UART, CAN, USB, SPI, J1850 and up to three external user interrupts.

Bus Interface Unit

The Bus Interface Unit (BIU) 118 provides simple and direct memory-mapped access to the external peripherals. The present invention memory interface block allows direct connection to a variety of 8-bit, 16-bit RAMs or ROMs on the system interface. The chip of the present invention generates the needed control signals for external RAMs and ROMs. The programmable wait state control registers set by the software to support wide range of speed of the external memory. It also supports the wait state insertion protocol to add the additional wait states. The BIU 118 also can support the parallel interface protocol to allow the external host CPU to access the internal memorys 114, 104, and 116, and other registers of the present invention.

Timer/PWM

The present invention also provides a Pulse Width Modulated (PWM) output signal via the PWM block 132. The frequency and duty cycle is programmable. In addition, the present invention optionally provides a timer function whereby a free-running counter may be used to raise interrupts when the count value reaches a programmable threshold. Similarly, the present invention provides a watchdog function whereby a free-running counter requires a regular service by the controlling software.

Programmable Interface of the Present Invention

The architecture of the present invention comprises a multiple-protocol interface that can be connected to several different types of standard interfaces. For example, I2C, SPI, CAN, USB, J1850, MOST, Parallel, and Address/Data Bus interfaces can connect to the architecture 100 via a single input as described below. The architecture can either be programmed a priori to accept a given input, e.g., USB inputs, or can automatically detect a specific type of signal or the presence of a signal on a given signal line, and self-program to accept and transmit data using that protocol. Several types of interfaces compatible with the architecture 100 of the present invention are as follows:

I2C

The present invention I2C interface 140 is capable of both master and slave modes of operation in the multi-master environment as defined in the I2C standard protocol that is incorporated by reference herein. There are two pin bidirectional signals in the I2C interface 140.

SPI

The SPI block 142 is a standard 4-pin serial peripheral interface for inter-IC control communication. It contains a 10 word×24-bit receive buffer for message buffering in order to reduce the frequency of interrupt of the ARM processor 102.

CAN

The CAN 2.0 144 interface is compatible with both class A (11-bit identifier) and class B (29-bit identifier) interfaces. The data/message rate for FMEA (position fix data) is about 4 Kbit/sec including 5–6 FMEA messages of approximately 60 Bytes each. The rate for Dead Reckoning (DR) would need about 50–100 Kbit/sec. The CAN 144 supports both 10 Kbit/sec and 1 Mbit/sec message rates. The physical transceiver interface is typically outside of the chip.

USB

The device of the present interface contains a high speed USB interface 146 including an on-chip physical transceiver. The USB interface 146 is compliant with revision 1.1 of the USB standard, giving an interface transfer rate of 12 Mbits$^{-1}$. The USB interface 146 supports a control channel endpoint and 2 interrupt-type endpoints, each with a minimum of 16 bytes of local storage. It also supports 2 bulk transfer points with 64 bytes each of local storage.

J1850

The present invention also comprises data link and protocol layers that support the J1850 Class II VPW protocol interface 148 for Chrysler, Toyota, and GM J1850 networks. The physical link is a single wire and single ended at 7V. The speed is 10.4 Kbps with CRC & message filtering in software and hardware.

GPIO

The device of the present invention provides a number of general purpose Input/Outputs (GPIO) at interface 150, accessible by the embedded processor. The status of the general purpose inputs may be determined by polling.

These general purpose I/Os 150 are multiplexed with other functions where possible to increase the number of GPIO pins without increasing the pin budget. The exact number available depends upon which version of the die is being bonded out.

MOST, and Other Supported Interfaces

The interface of the present invention also comprises a MOST interface 152, a parallel port interface 154, and an address/data bus interface 156. The MOST interface 152 is capable of carrying MPEG level data on an automotive optical bus, and is used to control various peripherals in an automotive environment. Parallel port interface 154 is typically used to connect the tracker architecture 100 to a computer other than the ARM 102.

IO Specification

A typical Input/Output specification for the present invention is shown in Appendix B.

Last Segment

Access to the memory RAM1 158, RAM2 160, RAM3 162, and RAM4 164, when the engine locked the memory, typically generated an abort instruction to the CPU. This ERROR generation has been removed for the present invention and replace by a WAIT function. Every time the CPU will access the engine RAM1 158 through RAM4 164 when the engine locked them the SBU bridge will keep BWAIT High until the engine release the memory, and execute the access to the memory.

Synchronous Memories

All internal memories 104,114, 116, and 158–164 are synchronous. All DSP memories are connected to ENG-CLK_N.

Operation of the Interface

The interface 166, which comprises all of the protocols mentioned herein, allows the tracker architecture 100 of the present invention to connect to various input and output signals that are present in the environments that the architecture 100 will typically reside in. The interface 166 can be pre-programmed by the chip manufacturer, prior to shipment to a specific customer, to accept a given protocol, in essence, enabling one or more of the protocols, or disabling one or more of the protocols, as desired. Further, the architecture 100 can be auto-detecting in nature, where the architecture senses the presence or absence of certain signals, and through the detection or absence of certain signals, determines which protocol the architecture 100 is connected to. The architecture then responds in the given protocol.

As an example, and not meant to be a limitation of the present invention, the architecture can be a priori programmed to accept only the J1850 interface 148 inputs and the GPIO 150 inputs, and reject inputs from an I2C interface 140. In an alternative of this example, again not by way of limitation, once the architecture 100 is connected to J1850 interface 148 input signals, the architecture 100 can automatically detect which of the protocols is present and accept the J1850 148 signals, and respond in kind.

Manual programming after delivery is also possible, as is changing of the protocol that interface 166 and architecture 100 will accept.

CONCLUSION

This concludes the description of the preferred embodiment of the invention. The following paragraphs describe some alternative methods of accomplishing the same objects. The present invention, although described with respect to GPS systems, can be utilized with any Satellite Positioning System (SATPS) without departing from the scope of the present invention. Further, other CPU processors can be used without departing from the scope of the present invention.

In summary, a tracker architecture for Global Positioning System (GPS) receivers in accordance with the present invention comprises a bus structure, a Central Processing Unit (CPU) core, cache, RAM, and ROM memories, and a GPS engine that comprises a receiving, tracking, and demodulating engine for GPS and Wide Area Augmentation Service (WAAS) signals. The GPS architecture can couple to at least two different protocol interfaces via the bus structure, where the protocol interfaces are commonly used in different applications.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims appended hereto.

APPENDIX A a7tdmi: ARM7TDMI CPU
arbiter: CPU bus arbitrator
beacon: Beacon signal processing unit
biu: Bus interface unit
cachectl: Cache control unit
cpm: Clock generator unit
decoder: Memory map decoder unit
ENGINE: GPS signal processing unit
itmod: Interrupt Control Unit 16 bits access (for rom boot code only)
itmod32: Interrupt Control Unit 32 bit access
mismod: Chip configuration, test control unit
sbul: SiRF internal peripheral bridge unit
ram1: GPS engine channel control
ram2: GPS signal processing channel control buffer
ram3: GPS signal processing coherence integration data
ram4: GPS signal processing output data
bram: GPS battery backup memory
RTC: Real time counter unit
ONRAM CTL: On-chip RAM
ROM CTL: On-chip boot ROM
tracker: GPS Hardwired Tracking Loop processing unit
UART: Dual UART unit
gpio: General purpose IP unit
I2C: I2C interface unit CAN: CAN 2.0 interface unit
USB: USB interface unit
BSPI: BSPI interface unit
WDT: Watch dog timer unit PWM: Pulse width modulation unit
ADC: 14-bit analog-to-digital conversion unit
J1850: J1850 interface unit
ASB: Advanced System Bus

APPENDIX B

| | | | | | ATPG Mode | SiRF Mode | |
| Pad | 144 Pin | 48 Pin | Default function after reset | Alternate function | 1(Select via JTAG) | (Select via JTAG) | Debug (SW) |
|---|---|---|---|---|---|---|---|
| 4 | 4 | 0 | EA[19:16] | | | TBUS[19:16] | |
| 16 | 16 | 0 | EA[15:0] | | | TBUS[15:0] | |
| 5 | 5 | 0 | ED[15:10] | GPIO[31:26] | | | TestBus[15:10] |
| 3 | 3 | 0 | ED[9:8] | | | | TestBus[9:8] |
| 7 | 7 | 0 | ED[7:1] | | | | |
| 1 | 1 | 0 | ED[0] | | | | |
| 1 | 1 | 0 | CS_N[0] | | | | |
| 1 | 1 | 0 | GPIO[22] | CS_N[1] | | TCON0 | |
| 1 | 1 | 0 | GPIO[23] | CS_N[2] | | TCON1 | TestBus[7] |
| 1 | 1 | 0 | GPIO[24] | CS_N[3] | | TACK | TestBus[6] |
| 1 | 1 | 0 | GPIO[25] | CS_N[4] | | SIRF/SSL | TestBus[5] |
| 1 | 1 | 0 | GPIO[21] | READY_n | | | TestBus[4] |
| 1 | 1 | 1 | ECLK | | SCAN_CLK | | |
| 1 | 1 | 1 | GPIO[13] | SCLK | SCAN_OUT0 | | |
| 1 | 1 | 1 | GPIO[12] | SK/SPI_SCLK | | | |
| 1 | 1 | 1 | SRESET_N | | | | |
| 1 | 1 | 0 | MWE_N | | | | |
| 1 | 1 | 0 | MUL_N[0] | | | | |
| 1 | 1 | 0 | MUL_N[1] | | | | |
| 1 | 1 | 0 | MOE_N | | | | |

50 50 4
GPS data and clock - GRF interface -

| 1 | 1 | 1 | GPSCLK | | SCAN_IN4 | | |
|---|---|---|---|---|---|---|---|
| 1 | 1 | 1 | ACQCLK | | SCAN_IN3 | | |
| 1 | 1 | 1 | MAG | | SCAN_IN2 | | |
| 1 | 1 | 1 | SIGN | | SCAN_IN1 | | |
| 1 | 1 | 1 | VREF | | | | |

5 5 5
AGC output - GRF Interface -

| 1 | 1 | 1 | AGCDATA | | SCAN_OUT1 | | |
|---|---|---|---|---|---|---|---|

1 1 1
External interrupt

| 1 | 1 | 0 | GPIO[20] | EIT0 | | | |
|---|---|---|---|---|---|---|---|
| 1 | 1 | 1 | GPIO[11] | EIT1/TSYNC | | BIST_PF | |
| 1 | 1 | 0 | GPIO[19] | EIT2/DBGREQ | | | |

3 3 1
Peripheral interface

| 1 | 1 | 1 | GPIO[10] | TXA | SCAN_OUT5 | | TestBus[3] |
|---|---|---|---|---|---|---|---|
| 1 | 1 | 1 | GPIO[9] | RXA | SCAN_IN5 | | TestBus[2] |
| 1 | 1 | 1 | GPIO[8] | TXB | SCAN_OUT6 | | TestBus[1] |
| 1 | 1 | 1 | GPIO[7] | RXB | SCAN_IN6 | | TestBus[0] |
| 1 | 1 | 1 | GPIO[6] | PWM | SCAN_EN | | |
| 1 | 1 | 1 | GPIO[5] | I2C_SCL | | | |
| 1 | 1 | 1 | GPIO[4] | I2C_SDA | | | |
| 2 | 1 | 1 | USBSD − | | | | |
| 2 | 1 | 1 | USBSD + | | | | |
| 1 | 1 | 0 | GPIO[18] | CANTX | | | Gosat |
| 1 | 1 | 0 | GPIO[17] | J1850TX | | | |
| 1 | 1 | 0 | GPIO[16] | CANRX | | | waitfftdetect |
| 1 | 1 | 0 | GPIO[15] | J1850RX | | | |
| 1 | 1 | 1 | GPIO[3] | SI/SPI_MISO | SCAN_OUT7 | | |
| 1 | 1 | 1 | GPIO[2] | SO/SPI_MOSI | SCAN_IN7 | | |
| 1 | 1 | 1 | GPIO[1] | GRFACTIV | SCAN_OUT2 | | |
| 1 | 1 | 0 | GPIO[14] | RFPWRUP | | | |
| 1 | 1 | 1 | GPIO[0] | TIMEMARK/ BREAK | SCAN_IN0 | | |
| 1 | 1 | 0 | ADCIP[3] | ADCVref | | | |

APPENDIX B-continued

| | | | |
|---|---|---|---|
| 2 | 2 | 2 | ADCIP[2:1] |
| 1 | 1 | 0 | ADCIP[0] |
| 1 | 1 | 1 | ADCVcc |
| 1 | 1 | 1 | ADCVss |
| 26 | 24 | 17 | |

RTC interface

| | | | | |
|---|---|---|---|---|
| 1 | 1 | 0 | RTCRST | |
| 1 | 1 | 1 | RIN | |
| 1 | 1 | 1 | ROUT | |
| 1 | 1 | 1 | WAKEUP_N | SCAN_OUT3 |
| 4 | 4 | 3 | | |

Test mode

| | | | |
|---|---|---|---|
| 1 | 1 | 1 | TMODE |
| 1 | 1 | 1 | |

Debug Interface

| | | | | |
|---|---|---|---|---|
| 1 | 1 | 1 | JTDI | |
| 1 | 1 | 1 | JTDO | SCAN_OUT4 |
| 1 | 1 | 1 | JTCK | |
| 1 | 1 | 1 | JTRST | |
| 1 | 1 | 1 | JTMS | |
| 5 | 5 | 5 | | |

Power & Ground

| | | | |
|---|---|---|---|
| 8 | 4 | 2 | Vcc_I |
| 14 | 7 | 2 | Vcc_E |
| 1 | 1 | 1 | Vcc_Pecl |
| 22 | 11 | 5 | |
| 2 | 1 | 1 | |
| 47 | 24 | 11 | |

TOTAL

| | | |
|---|---|---|
| 142 | 117 | 48 |

Input/Output specifications

| Pad | TIC Mode (Power Up Config) | SW Enable for PD/PU | Pull | Type | Descriptions | Power up config |
|---|---|---|---|---|---|---|
| 4 | | | / | IO | System Address Bus. EA[19:0] = BA[20:1] | |
| 16 | TIC_BUS[31:16] | | / | IO | System Address Bus. EA[19:0] = BA[20:1] | |
| 5 | TIC_BUS[15:10] | SWEN[5:0] | PD | IO | Data bus | |
| 3 | TIC_BUS[9:8] | SWEN[7:6] | PD | IO | Data bus | |
| 7 | TIC_BUS[7:1] | / | PD | IO | Data bus | |
| 1 | TIC_BUS[0] | / | PD | IO | Data bus | Select boot clock |
| 1 | | / | PU | O | External boot ROM Chip Select | |
| 1 | TREQA | / | PU | IO | External memory Chip Select, or GPIO. | |
| 1 | TREQB | / | PU | IO | External memory Chip Select, or GPIO. | |
| 1 | TACK | / | PU | IO | External memory Chip Select, or GPIO. | |
| 1 | TSIZE | / | PU | IO | External memory Chip Select, or GPIO. | |
| 1 | | / | PU | IO | Ready function or GPIO[ ] | |
| 1 | | | | In | External clock source. | |
| 1 | | SWEN[8] | PD | IO | System clock. All the control signals on the system bus synchronize with the system clock. | |
| 1 | | SWEN[9] | PD | IO | uwire clock or SPI clock | |
| 1 | | | | In | Low level sensitive reset to initialize the system and ARM7TDMI to known | |

APPENDIX B-continued

| | | | | | |
|---|---|---|---|---|---|
| | | | | | states. This has to be driven low by an external pull-down resistor when rtcVcc is connected and the rest of ASIC is not powered. |
| 1 | | / | / | O | Memory writes enable. |
| 1 | | / | / | O | Memory byte enable for byte 0; UL[0] = BA[0] (48 pkg) |
| 1 | | / | / | O | Memory byte enable for byte 1 |
| 1 | | / | / | O | Memory read enable. |

50
GPS data and clock - GRF interface -

| | | | | | |
|---|---|---|---|---|---|
| 1 | | / | / | In_P | Differential GPS clock input. PECL (Pseudo ECL) compatible |
| 1 | | / | / | In_P | Differential data acquisition clock. PECL compatible |
| 1 | | / | / | In_P | Differential satellite magnitude bit. PECL compatible. |
| 1 | | / | / | In_P | Differential Satellite data bit. PECL compatible |
| 1 | | / | / | In_P | PECL input reference voltage. PECL compatible. |

5
AGC output - GRF Interface -

| | | | | | |
|---|---|---|---|---|---|
| 1 | | / | / | O | Automatic gain control Serial Data. |

1
External interrupt

| | | | | | |
|---|---|---|---|---|---|
| 1 | | SWEN[10] | PU | IO | External Interrupt (level sensitive) or GPIO or IRQ in host mode | |
| 1 | | / | / | IO | External Interrupt (level sensitive) or GPIO or Timer sync function | DBGEN active |
| 1 | | / | PU | IO | External Interrupt (level sensitive) or GPIO or PWM output | |

3
Peripheral interface

| | | | | | |
|---|---|---|---|---|---|
| 1 | | | / | IO | Serial channel A output or I2C serial clock-open drain or GPIO | powerup[1] |
| 1 | | | / | IO | Serial channel A input or I2C serial data-open drain or GPIO | powerup[0] 00 = 8 bit mem 01 = 16 bit mem 10 = Arm JTAG 11 = Tic mode |
| 1 | | | / | IO | Serial channel B or GPIO | Internal boot |
| 1 | | | / | IO | Serial channel B or GPIO | Big/Little endian |
| 1 | | | / | IO | PWM or GPIO. | pkg144/48 |
| 1 | | SWEN[11] | PU | IO | I2C serial clock-open drain or GPIO | |
| 1 | | SWEN[11] | PU | IO | I2C serial data-open drain or GPIO | |
| 2 | | | / | IO | USB serial data − | |
| 2 | | | / | IO | USB serial data + | |
| 1 | | SWEN[12] | PU | IO | CAN transmit or GPIO | |
| 1 | | SWEN[13] | PU | IO | J1850 transmit or GPIO | |
| 1 | | SWEN[12] | PU | IO | CAN receive or GPIO | |
| 1 | | SWEN[13] | PU | IO | J1850 receive or GPIO | |
| 1 | | SWEN[9] | PU | IO | uwire data in or SPI master input or GPIO | |

APPENDIX B-continued

| | | | | |
|---|---|---|---|---|
| 1 | SWEN [9] | PU | IO | uwire data output or SPI master output or GPIO |
| 1 | / | / | O | GRF voltage regulator control or GPIO. Output after reset drive 1 |
| 1 | / | / | O | GRF power up control or GPIO. Output after reset drive 1 |
| 1 | / | PD | IO | 1 PPS Timemark output or GPIO or HW breakpoint |
| 1 | / | / | IO | Analog input or ADC bandgap voltage ref. For test only, bound to VDD for the 48 pkg |
| 2 | / | / | In | Analog input |
| 1 | / | / | In | Analog input, bound to VSS for the 48 pkg |
| 1 | / | / | In | Analog input supply |
| 1 | / | / | In | Analog input ground |
| 26 | | | | |
| RTC interface | | | | |
| 1 | / | PD | In | RTC reset (Does not reset the counters). |
| 1 | / | / | In | 32 kHz Clock Input |
| 1 | / | / | O | 32 kHz Clock Output |
| 1 | / | / | O | Active low wake up from the RTC (open drain) |
| 4 | | | | |
| Test mode | | | | |
| 1 | / | / | In | Enable test mode |
| 1 | | | | |
| Debug Interface | | | | |
| 1 | / | / | In | JTAG Interface | Soft.bit[0] |
| 1 | / | / | O | JTAG Interface | |
| 1 | / | / | In | JTAG Interface | Soft.bit[1] |
| 1 | / | / | In | JTAG Interface | Soft.bit[2] |
| 1 | / | / | In | JTAG Interface | Soft.bit[3] |
| 5 | | | | |
| Power & Ground | | | | |
| 8 | | | | Internal core Power rail |
| 14 | | | | Power rail for digital IO |
| 1 | | | | Power rail for Pecl input buff |
| 22 | | | | Vss |
| 2 | | | | Vccrtc |
| 47 | | | | |
| TOTAL | | | | |
| 142 | | | | |

Followings are the signal type definitions:
  In: Input as a standard TTL level
  In_P: Input as a differential PECL level
  IO: Tri-state bi-directional input/output pin
  O: Tri-state output pin NOTES: *1: 75K Ohms pull-up
  *2: 75K Ohms pull-down
  *3: configuration pins Analog to Digital converter (ADC)

ADCC ref is the reference for the ADC with typical 3.3V level

ADCvss is the reference group for the ADC. It must be held at typically the same potential as Vss.

ADC shall have four analog singled input or two analog differential input multiplexing under control of the local software. The ADC, 14 bit resolutions, operating at 100Hz, shall be capable of being powered-down and re-awaken by the controlling software.

PWM Output

GSP2t shall have at least 1 PWM output, which can be multiplexing with other pins. Each PWM shall have several registers to control and set variable duty cycles. PWM counter shall have at least 10-bit resolution. PWM counter frequency can be selectable from 48MHz to 38MHz and divisible from 2 to 32.

USB

The device shall contain a USB controller and on-chip USB physical transceiver.

J1850

The device shall contain a J1850 interface with external transceiver. Both the protocol Layer and Data Link layer hardware modules shall be incorporated. The GM/Chrysler version should be supported.

CAN

The GSP2t device shall provide a CAN 2.0 interface.

SPI

The device shall provide a buffered SPI interface.

I2C

The device shall provide an I2C interface, capable of both master and slave mode of operation in a multi-master environment.

Microwire

The device shall provide a three-wire interface, capable of both master and slave mode of operation in a multi-master environment.

What is claimed is:

1. A Global Positioning System (GPS) architecture used for tracking at least one GPS satellite, comprising:
a bus structure;
a Central Processing Unit (CPU) core comprising a microprocessor, coupled to the bus structure;
a cache memory coupled to the bus structure for storing software code;
a random access memory, coupled to the bus structure, for storing data;
a read only memory, coupled to the bus structure, for storing a boot program; and
a GPS engine, comprising:
a receiving, tracking, and demodulating engine for GPS and Wide Area Augmentation Service (WAAS) signals,
wherein the GPS architecture can couple to at least two different protocol interfaces via a multiple-protocol interface to the bus structure, where the multiple-protocol interface is compatible with the at least two different protocol interfaces.

2. The GPS architecture of claim 1, wherein the cache memory can be used as a local random access memory.

3. The GPS architecture of claim 2, wherein the CPU can be used for running applications other than GPS tracking.

4. The GPS architecture of claim 3, wherein the GPS engine further comprises a beacon processor.

5. The GPS architecture of claim 3, wherein the GPS engine nms on a separate bus structure.

6. The GPS architecture of claim 5, wherein the GPS engine fuither comprises inputs from a real time clock external to the GPS engine.

7. The GPS arcbitecture of claim 6, further comprising a bus interface unit.

8. The GPS architecture of claim 7, wherein the protocol interfaces are selected from the group consisting of I2C, CAN, PWM, SPI, J1850, USB, GPIO, MOST, parallel, and an address/data bus interface.

9. The GPS architecture of claim 8, wherein the protocol interface is selected a priori.

10. The GPS architecture of claim 8, wherein the protocol interface is selected by the GPS architecture through sensing a signal in the protocol interface.

11. A Global Positioning System (GPS) architecture used for tracking at least one GPS satellite, comprising:
a bus structure;
a Central Processing Unit (CPU) core comprising a microprocessor, coupled to the bus structure;
a cache memory coupled to the bus structure for storing software code;
a random access memory, coupled to the bus structure, for storing data and for storing autonomous code used for tracking at least one GPS satellite;
a read only memory, coupled to the bus structure, for storing a boot program;
a multiple-protocol interface to the bus structure; and
a GPS engine, comprising:
a receiving, tracking, and demodulating engine for GPS and Wide Area Augmentation Service (WAAS) signals,
wherein the GPS engine can selectively use the stored autonomous code for tracking at least one GPS satellite.

12. The GPS architecture of claim 11, wherein the architecture can couple, via the multinle-protocol interface, to at least two different protocol interfaces, selected from the goup consisting of I2C, CAN, PWM, SIN, J1850, USB, GPIO, MOST, parallel, and an address/data bus interface.

13. The GPS architecture of claim 12, wherein the cache memory can be used as a local random access memory.

14. The GPS architecture of claim 13, wherein the CPU can be used for running applications other than GPS tracking.

15. The GPS architecture of claim 14, wherein the GPS engine further comprises a beacon processor.

16. The GPS architecture of claim 14, wherein the GPS engine runs on a separate bus structure.

17. The GPS architecture of claim 16, wherein the GPS engine further comprises inputs from a real time clock external to the GPS engine.

18. The GPS architecture of claim 17, further comprising a bus interface unit.

19. The GPS architecture of claim 17, wherein the protocol interface is selected a priori.

20. The GPS architecture of claim 17, wherein the protocol interface is selected by the GPS architecture through sensing a signal in the protocol interface.

21. A Global Positioning System (GPS) architecture used for tracking at least one GPS satellite, comprising:
a bus structure,
a Central Processing Unit (CPU) core comprising a microprocessor, coupled to the bus structure;
a cache memory coupled to the bus structure for storing software code;
a random access memory, coupled to the bus structure, for storing data;
a read only memory, coupled to the bus structure, for storing a boot program; and
a GPS engine, comprising:
a receiving, tracking, and demodulating engine for GPS and Wide Area Augmentation Service (WAAS) signals,
wherein the GPS architecture can couple, via a multiple-protocol interface to the bus structure, to at least two different protocol interfh.ces, and wherein the protocol interface is selected by the GPS architecture automatically.

* * * * *